United States Patent
Porter et al.

(10) Patent No.: US 8,011,059 B2
(45) Date of Patent: Sep. 6, 2011

(54) LOW-PROFILE AIR DUCT FITTING FOR PASSAGE OF AIR THROUGH NARROW OPENINGS AND METHOD OF USING THE SAME

(75) Inventors: David R. Porter, Sunset Hills, MO (US); Angela L. Porter, Sunset Hills, MO (US)

(73) Assignee: FURminator, Inc., Fenton, MO (US)

( * ) Notice: Subject to any disclaimer, the term of this patent is extended or adjusted under 35 U.S.C. 154(b) by 704 days.

(21) Appl. No.: 12/177,268

(22) Filed: Jul. 22, 2008

(65) Prior Publication Data

US 2010/0018472 A1     Jan. 28, 2010

(51) Int. Cl.
*A47L 5/00* (2006.01)

(52) U.S. Cl. ............ 15/314; 15/315; 15/246.2; 15/414; 119/606

(58) Field of Classification Search .......... 15/312.2, 15/314, 315, 246.2, 414; 119/606; *A47L 5/00, A47L 9/02*
See application file for complete search history.

(56) References Cited

U.S. PATENT DOCUMENTS

| | | | | |
|---|---|---|---|---|
| 4,729,147 A | * | 3/1988 | Armbruster | 15/314 |
| 5,535,478 A | * | 7/1996 | Thompson | 15/401 |
| 7,347,166 B2 | * | 3/2008 | Roman-Barcelo | 119/677 |
| 7,874,041 B2 | * | 1/2011 | Buller et al. | 15/351 |
| 2007/0044859 A1 | * | 3/2007 | Peterson | 138/119 |

* cited by examiner

*Primary Examiner* — David Redding

(74) *Attorney, Agent, or Firm* — Thompson Coburn LLP; Clyde L. Smith

(57) ABSTRACT

An air duct comprises a duct wall bounding an airflow channel that extends through the air duct along a flow path. The airflow channel has a plurality of cross-sections that are bounded by the duct wall and that are perpendicular to the flow path. A first one of the cross-sections has an aspect ratio that is less than two. A second one of the cross-sections has an aspect ratio that is greater than four and a minimum dimension that is less than three-quarters of an inch. A third one of the cross-sections has an aspect ratio that is less than two. The second cross-section is positioned between the first and third cross-sections along the flow path. The air duct channels air beneath a door, thereby allowing a vacuum or blower tool to operate in one room while the vacuum or blower device operating the tool operates in a different room.

17 Claims, 4 Drawing Sheets

LOW-PROFILE AIR DUCT FITTING FOR PASSAGE OF AIR THROUGH NARROW OPENINGS AND METHOD OF USING THE SAME

CROSS-REFERENCE TO RELATED APPLICATIONS

None.

STATEMENT REGARDING FEDERALLY SPONSORED RESEARCH DEVELOPMENT

Not Applicable.

APPENDIX

Not Applicable.

BACKGROUND OF THE INVENTION

1. Field of the Invention

This invention pertains generally to vacuum and blower hose accessories. More particularly, the invention pertains to an air duct that configured to channel air through narrow openings, such as beneath a door or under a window, without substantially impeding the flow rate of the channeled air.

2. General Background Technology

Vacuum cleaners and air blowers are utilized for countless purposes. Many of such devices comprise a vacuum pump or blower motor and one or more flexible air hoses adapted to channel air to or from the vacuum pump or blower motor. Air hoses allow vacuum or blower tools to move while the pump or blower remains stationary. As can be appreciated, most pumps and blowers are relative loud during operation. While such noise is generally acceptable, it can be problematic in some situations. For example, the noise is problematic when a vacuum cleaner is used to remove shed fur directly from a pet and when a blower is used to dry the coat of a pet. Many animals react adversely to loud noises during such procedures, thereby making such procedures more complicated and time consuming. Numerous other situations exist in which it is desirable to minimize the noise transferred from a blower or pump to the user of a connected vacuum or blower tool.

SUMMARY OF THE INVENTION

The present invention is particularly directed to shielding a user from the noise generated by a blower or pump by providing an air-duct configured to channel air through narrow opening, such as the opening beneath a door or other object. By channeling the air beneath a door or other object, the door or object will act as a noise barrier between the user of vacuum or blower tool and the motor or blower powering it. To channel the air in such a manner, the cross-sections of the flow passageway that extends through the air duct transitions from a low aspect ratio (i.e., near 1.0 maximum dimension-to-minimum dimension ratio), to a relatively high aspect ratio, and then back to a low aspect ratio.

In one aspect of the invention, a method of grooming a pet comprises attaching a toothed grooming tool to a first end of a first flexible air hose. The grooming tool comprises an air inlet and the first flexible air hose comprises a second end. The method also includes attaching the second end of the first flexible air hose to an air duct. The air duct is adapted and configured to channel air beneath a door by increasing the aspect ratio of channeled air flow prior to passing said air flow beneath the door and decreasing the aspect ratio of the channeled airflow after passing said air flow beneath the door. The method also comprises attaching a first end of a second flexible air hose to the air duct. The second flexible air hose has a second end. Still further, the method comprises attaching the second end of the second flexible air hose to vacuum device and using the grooming tool in manner removing hair from a pet. Additionally, the method comprises operating the vacuum device in a manner drawing air and at least some of the hair into the air inlet of the grooming tool and through the first flexible air hose, the air duct, and the second flexible air hose while the air duct is positioned beneath a door.

In another aspect of the invention, an air duct comprises a duct wall bounding an airflow channel that extends through the air duct along a flow path. The airflow channel has a plurality of cross-sections that are bounded by the duct wall and that are perpendicular to the flow path. A first one of the cross-sections has an aspect ratio that is less than two. A second one of the cross-sections has an aspect ratio that is greater than four and a minimum dimension that is less than three-quarters of an inch. A third one of the cross-sections has an aspect ratio that is less than two. The second cross-section is positioned between the first and third cross-sections along the flow path.

In yet another aspect of the invention, a method of channeling air past a door comprises channeling air through an air duct. The air duct comprises a duct wall bounding an airflow channel that extends through the air duct along a flow path. The airflow channel has a plurality of cross-sections that are bounded by the duct wall and that are perpendicular to the flow path. A first one of the cross-sections has an aspect ratio that is less than two. A second one of the cross-sections has an aspect ratio that is greater than four and a minimum dimension that is less than three-quarters of an inch. A third one of the cross-sections has an aspect ratio that is less than two. The second cross-section is positioned between the first and third cross-sections along the flow path. One of opposite sides of the door faces the first cross section and the other of the opposite sides of the door faces the third cross-section.

Further features and advantages of the present invention, as well as the operation of various embodiments of the present invention, are described in detail below with reference to the accompanying drawings.

Figure 1:
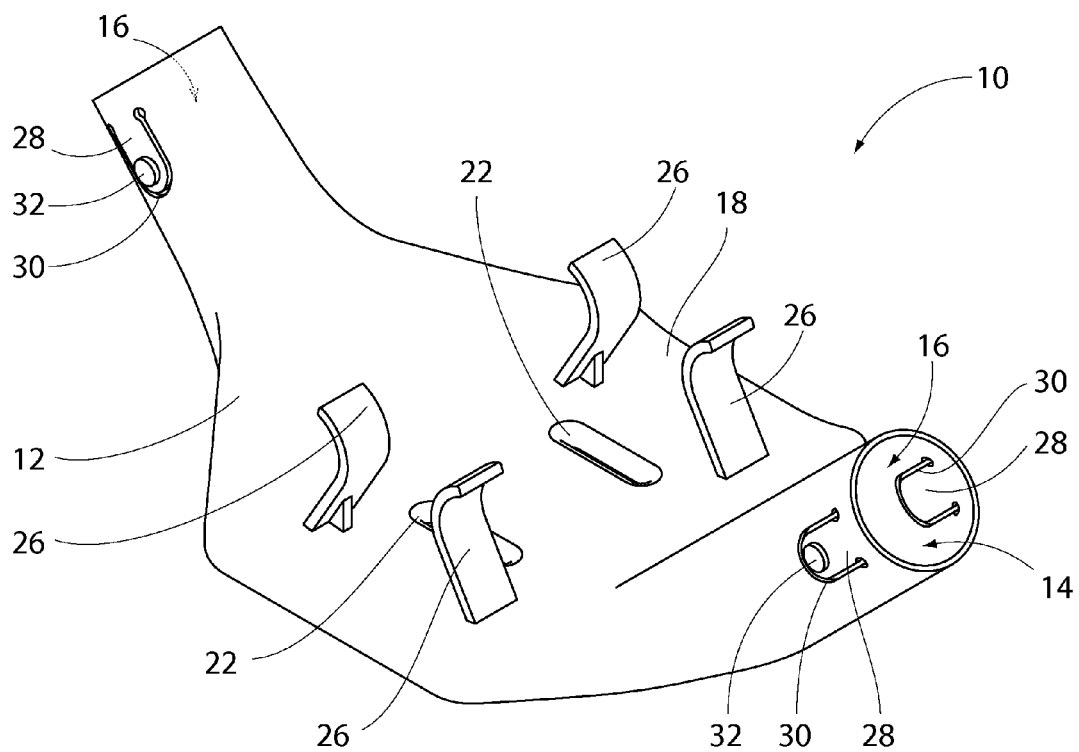
FIG. 1 is a perspective view of a low-profile air duct fitting in accordance with the invention.
Figure 2:
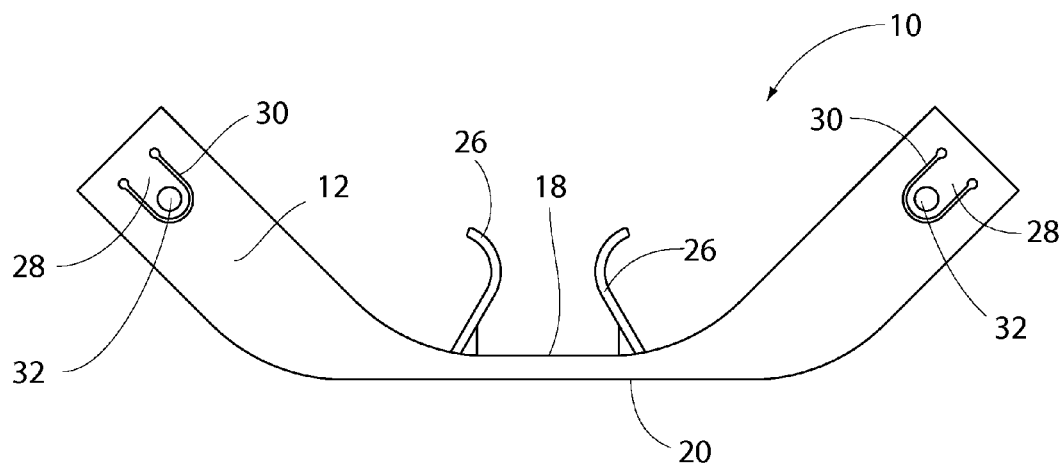
FIG. 2 is a front view of the air duct fitting shown in FIG. 1.
Figure 3:
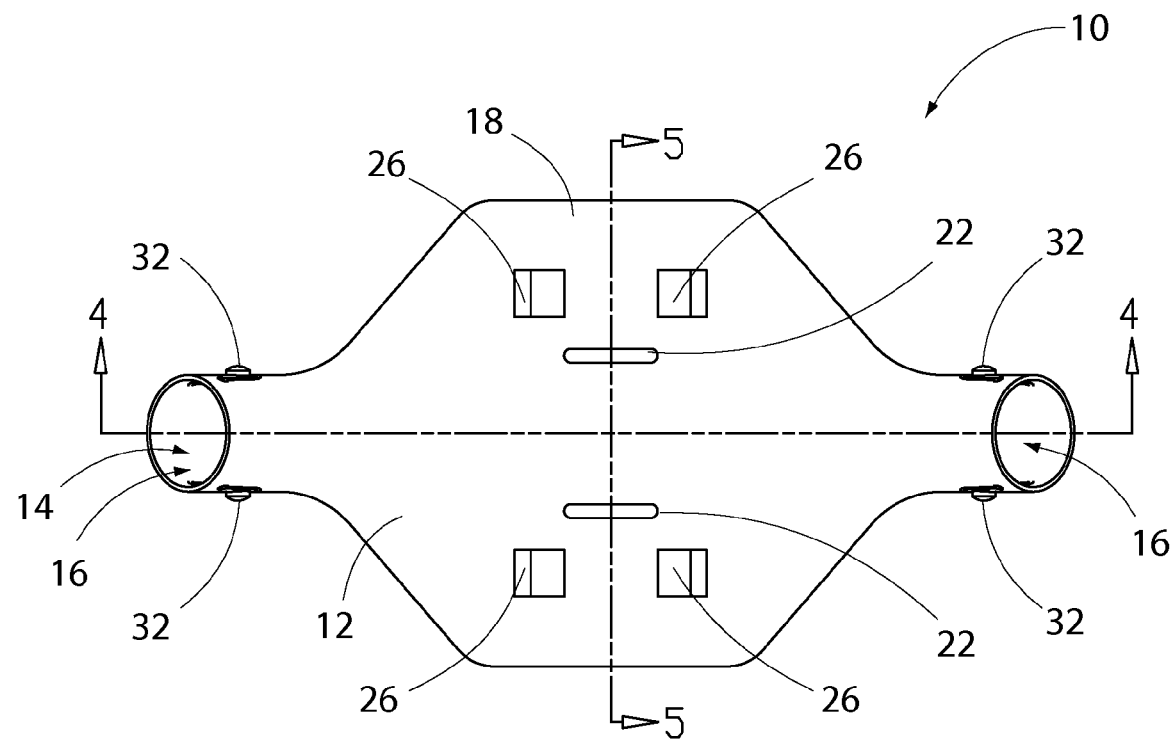
FIG. 3 is top view of the air duct fitting shown in FIGS. 1 and 2.
Figure 4:
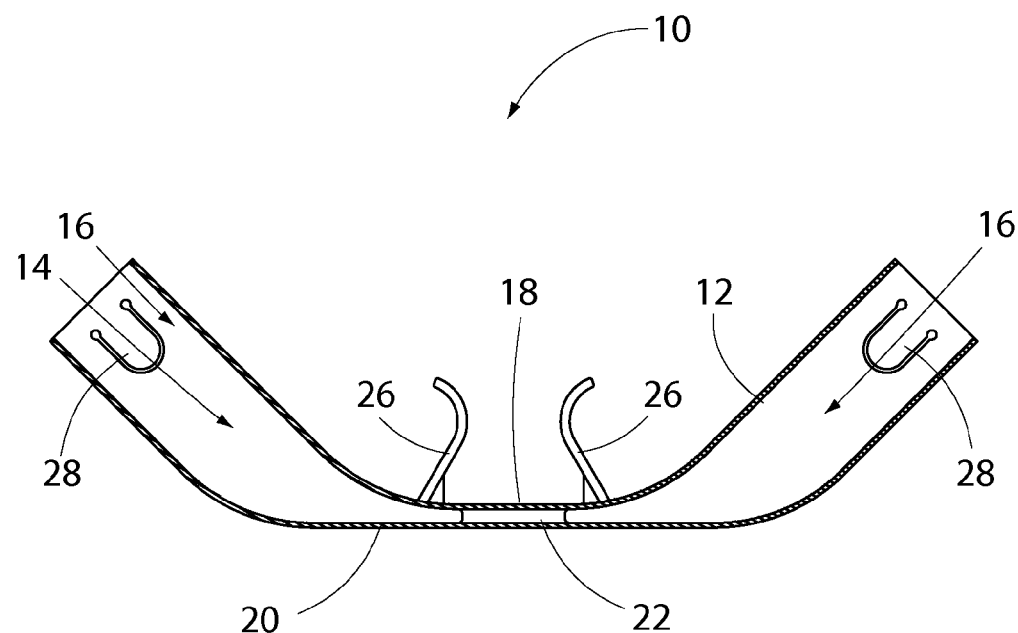
FIG. 4 is cross-sectional view of the air duct fitting shown in FIGS. 1-3, taken about the line 4-4 shown in FIG. 3.
Figure 5:
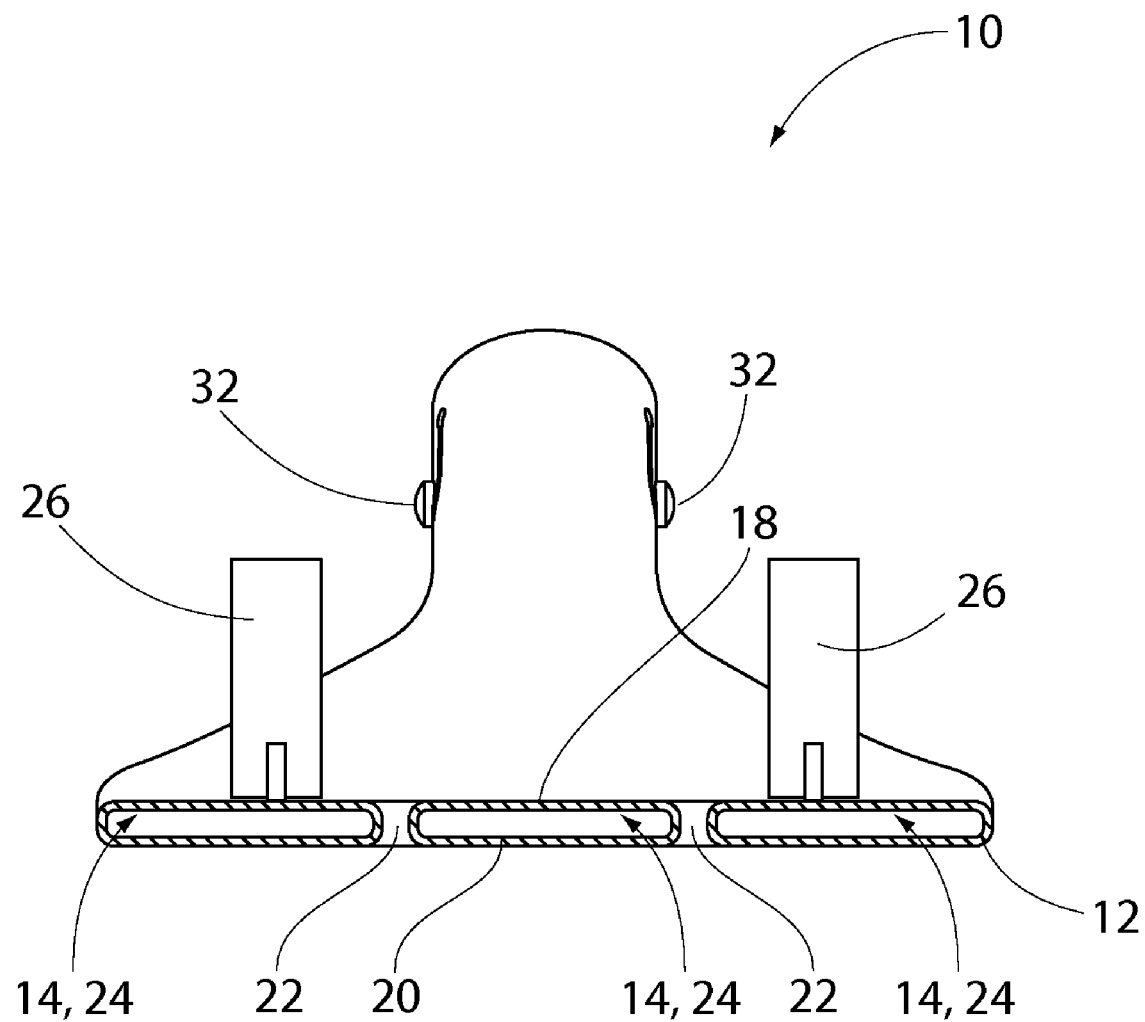
FIG. 5 is cross-sectional view of the air duct fitting shown in FIGS. 1-3, taken about the line 5-5 shown in FIG. 3.

Reference numerals in the written specification and in the drawing figures indicate corresponding items.

DETAILED DESCRIPTION OF THE PREFERRED EMBODIMENTS

A low-profile air duct fitting in accordance with the invention is shown in FIGS. 1-5. The air duct fitting 10 preferably is formed of molded plastic. The air duct 10 comprises a duct wall 12 that forms an airflow channel 14 that extends through the air duct from one of opposite air openings 16 to the other. The airflow channel 14 defines a flow path through the air duct 10, which is an imaginary path that is generally tangent to the average direction that air travels through the air duct. The duct wall 12 is preferably shaped such that the cross-sectional area of the airflow channel 18 (i.e., the area perpendicular to the flow path) is generally circular at each of the opposite air openings 16. The duct wall 12 is also preferably shaped such that the cross-sectional area of the airflow channel 14 transitions to having a high aspect ratio, rectangular shape near the center of the air duct 10 between the opposite air openings 16. Preferably, the airflow channel 14 maintains a maximum-to-minimum cross-sectional area ratio of no more than 2.0, and more preferably of no more than 1.5, as it extends along the flow path from one of the opposite air openings 16 to the other. Additionally, the aspect ratio of the airflow channel 14 near the midpoint of the flow path is preferably greater than 4.0, with the minimum dimension of the cross-sectional area preferably being less than three-quarters of an inch, and more preferably less than a quarter of an inch. Still further, the duct wall 12 near the midpoint of the flow path preferably forms opposite top 18 and bottom 20 planar wall portions. Preferably, the flow path is non-linear such that the bottom planar wall portion 20 can be placed against another much larger planer surface.

The air duct 10 also preferably comprises a plurality of hollow stiffeners 22 that extend through the airflow channel 14 of the air duct from the top planar wall portion 18 to the bottom planar wall portion 20 of the duct wall 12. The stiffeners 22 are preferably hollow to allow them to be easily formed integrally with the duct wall 12. The stiffeners 22 divide the air flow channel 14 into a plurality of sub-channels 24, the collective cross-sections of which, for purposes of describing the present invention, constitute the cross-section of the airflow channel midway along the flow path.

Still further, the air duct 10 preferably comprises a plurality of resilient protrusions 26 that protrude upwardly from the top planer wall portion 18 of the duct wall 12, and a plurality of locking tabs 28. At least one of the resilient protrusions 26 is spaced from and faces another of the resilient protrusions. Such resilient protrusion 26 are configured and adapted to be able to resiliently deflect away from each other. The locking tabs 28 are formed near each of the opposite air openings 16 of the duct wall 12 by slits 30 that extend through the duct wall. Each locking tab 28 preferably comprises a locking protrusion 32 that protrudes outwardly from the duct wall 12. The locking tabs 28 are configured and adapted to resiliently deflect in a manner such that the locking protrusion 32 can resiliently be forced inward toward the airflow channel 14.

Figure 6:
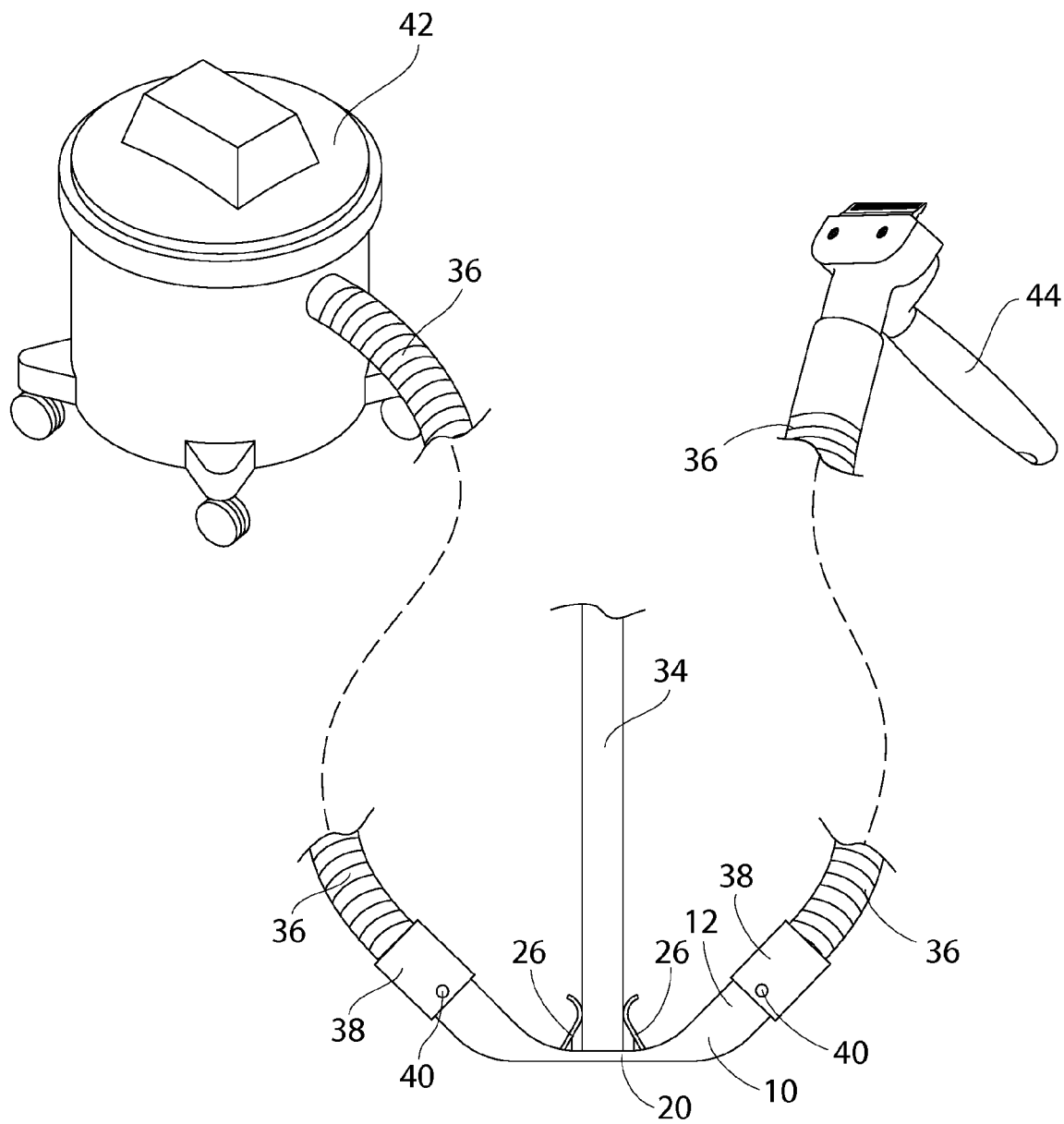
FIG. 6 is a broken assembly view of an assembly in accordance with the invention.

In use, the air duct 10 can be placed under or along the side of a door or window 34 (as shown in FIG. 6. Preferably, the door or window 34 is positioned against the top planer wall portion 18 of the air duct 10. The resilient protrusions 26 are preferably configured and adapted to engage the door or window 34 in a manner such that they resiliently deflect and thereby releasably clip the air duct 10 to the door or window. The opposite air openings 16 are each configured and adapted to be operatively connected to an air conduit, such as formed by a flexible air hose 36. To facilitate this, the air hose 36 may have a fitting 38 that is adapted to overlap the ends of the duct wall 12 adjacent each of the opposite air openings 16. Moreover, the fitting 38 of such an air hose 36 may have locking openings 40 that are configured to cooperate with the locking tabs 28 of the air duct 10. It should be appreciated that when such an air hose 36 is being attached to the air duct 10, the fitting 38 of the air hose initially deflects the locking protrusions 32 of the locking tabs 28 toward each other in manner such that the fitting slides over the locking protrusions until the locking protrusions are aligned with the locking openings 40 of the fitting. When aligned, the locking tabs 28 resiliently return to their undeflected configuration, thereby causing the locking protrusions 32 to move into the locking openings 40 of the fitting 38. This helps in preventing the air hose 36 from being inadvertently disconnected from the air duct 10. The air hose 36 can be detached from the air duct 10 by simply squeezing the locking protrusions 32 while simultaneously pulling the air hose from the air duct. Of course, it should be appreciated that other types of hose attachment fittings could alternatively be used or the air hose could be formed integrally with the air duct. As shown in FIG. 6, a vacuum or blower device 42 can be attached to the air duct 10 via one of the air hoses 36. Additionally, a vacuum or blower tool 44, such as pet grooming tool as described in U.S. application Ser. No. 11/942,437 (which is incorporated herein by reference in its entirety), can be attached to the other air hose 36.

With the a vacuum or blower tool 44 and the vacuum or blower device 42 attached to the air duct 10 via the air hoses 36, the vacuum or blower device can be operated to draw air into or out of the vacuum or blower tool and through the air duct. The stiffeners 22 help prevent the air duct 10 from ballooning when air is blown through the air duct and help prevent the airflow channel 14 from collapsing when air is drawn through the air duct. The stiffeners 22 are preferably dimensioned such that hair will not get tangled around the stiffeners when the air duct 10 is used in combination with a pet grooming tool to suck up fur shed or cut from a pet. More specifically, the stiffeners 22 are preferably rounded and preferably have a perimeter dimension that is greater than the length of the fur such that the fur is less likely to become wrapped around stiffeners or frictionally held by the stiffeners.

It should be appreciated that the air duct 10 allows a vacuum or blower tool 44 to be used while the vacuum or blower device 42 that powers it is positioned on the opposite side of a closed or partially closed window or door. This greatly decreases the noise on the tool 44 side of the door or window.

In view of the foregoing, it will be seen that the several advantages of the invention are achieved and attained.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An air duct comprising:
   a duct wall bounding an airflow channel that extends through the air duct along a flow path, the airflow channel having a plurality of cross-sections that are bounded by the duct wall and that are perpendicular to the flow path, a first one of the cross-sections having an aspect ratio that is less than two, a second one of the cross-sections having an aspect ratio that is greater than four and a minimum dimension that is less than three-quarters of an inch, a third one of the cross-sections having an aspect ratio that is less than two, the second cross-section being positioned between the first and third cross-sections along the flow path.

2. An air duct in accordance with claim 1 wherein the flow path is non-linear and lies in a plane that intersects each of the first, second, and third cross-sections.

3. An air duct in accordance with claim 1 wherein the duct wall comprises opposite planer wall portions that bound the second cross-section of the airflow channel.

4. An air duct in accordance with claim 3 further comprising at least one stiffener that connects the opposite wall portions to each other and that divides the air channel into a plurality of sub-channels at the second cross-section of the airflow channel.

5. An air duct in accordance with claim 3 further comprising a plurality of resilient protrusions extending outwardly from one of the opposite wall portions of the duct wall, the resilient protrusions being adapted and configured to resiliently deflect in a manner enabling the air duct to be removably clipped to a door, the second cross-section being positioned between at least two of the resilient tabs.

6. An air duct in accordance with claim 1 further comprising first and second terminal ends, each of the first and second terminal ends being adapted and configured to be removably attachable to a flexible air hose.

7. An air duct in accordance with claim 6 wherein the first and third cross-sections are circular and the minimum dimension is less than a quarter of an inch.

8. A method of channeling air past a door, the method comprising:
   channeling air through an air duct, the air duct comprising a duct wall bounding an airflow channel that extends through the air duct along a flow path, the airflow channel having a plurality of cross-sections that are bounded by the duct wall and that are perpendicular to the flow path, a first one of the cross-sections having an aspect ratio that is less than two, a second one of the cross-sections having an aspect ratio that is greater than four and a minimum dimension that is less than three-quarters of an inch, a third one of the cross-sections having an aspect ratio that is less than two, the second cross-section being positioned between the first and third cross-sections along the flow path, one of opposite sides of the door facing the first cross-section and the other of the opposite sides of the door facing the third cross-section.

9. A method in accordance with claim 8 wherein the flow path of the air duct is non-linear and lies in a plane that intersects each of the first, second, and third cross-sections, and wherein the step of channeling the air through the air duct comprises channeling the air generally along the flow path.

10. A method in accordance with claim 8 wherein the duct wall of the air duct comprises opposite planer wall portions that bound the second cross-section of the airflow channel.

11. A method in accordance with claim 10 wherein the air duct comprises at least one stiffener that connects the opposite wall portions to each other and that divides the air channel into a plurality of sub-channels at the second cross-section of the airflow channel.

12. A method in accordance with claim 10 wherein the air duct comprises a plurality of resilient protrusions extending outwardly from one of the opposite wall portions of the duct wall, and further comprising a step of resiliently deflecting the resilient protrusions in a manner removably clipping the air duct to a door.

13. A method in accordance with claim 8 wherein the air duct further comprises first and second terminal ends, and further comprising removably attaching a flexible air hose to at least one of the first and second terminal ends.

14. A method in accordance with claim 13 wherein the first and third cross-sections of the air duct are circular.

15. A method of grooming a pet, the method comprising:
   attaching a toothed grooming tool to a first end of a first flexible air hose, the grooming tool comprising an air inlet; the first flexible air hose having a second end;
   attaching the second end of the first flexible air hose to an air duct, the air duct being adapted and configured to channel air beneath a door by increasing the aspect ratio of channeled air flow prior to passing said air flow beneath the door and decreasing the aspect ratio of the channeled airflow after passing said air flow beneath the door;
   attaching a first end of a second flexible air hose to the air duct, the second flexible air hose having a second end;
   attaching the second end of the second flexible air hose to vacuum device;
   using the grooming tool in manner removing hair from a pet;
   operating the vacuum device in a manner drawing air and at least some of the hair into the air inlet of the grooming tool and through the first flexible air hose, the air duct, and the second flexible air hose while the air duct is positioned beneath a door.

16. A method in accordance with claim 14 wherein the air duct comprises a duct wall bounding an airflow channel that extends through the air duct along a flow path, the airflow channel has a plurality of cross-sections that are bounded by the duct wall and that are perpendicular to the flow path, a first one of the cross-sections has an aspect ratio that is less than two, a second one of the cross-sections has an aspect ratio that is greater than four and a minimum dimension that is less than three-quarters of an inch, a third one of the cross-sections has an aspect ratio that is less than two, the second cross-section is positioned between the first and third cross-sections along the flow path.

17. A method in accordance with claim 15 wherein the minimum dimension is less than one quarter of an inch.

* * * * *